United States Patent Office 2,751,305
Patented June 19, 1956

2,751,305

PROCESS FOR PRESERVING ROUGH RICE

Socrates A. Kaloyereas, Baton Rouge, La., assignor to Board of Supervisors of Louisiana State University and Agricultural and Mechanical College, Baton Rouge, La.

No Drawing. Application May 6, 1954,
Serial No. 428,125

6 Claims. (Cl. 99—153)

This invention relates to the preservation of rough rice, i. e., the unmilled, undried rice as harvested, which usually contains from 20% to 30% moisture, the exact moisture content within this range being dependent on the variety of the rice and the locality of its growth. All percentages herein, unless otherwise stated, are on a weight basis.

Rough rice cannot be preserved as such for more than a few days, because it tends to spoil due to a combination of factors among which may be mentioned respiration and growth of microorganisms, which growth is aggravated by the high temperatures and humidity of the air invariably present in the storage bin. In view of these spoilage tendencies, it has been the practice to dry the rice to a reasonably safe moisture content (about 14%) before it is put into storage. This necessitates large and relatively expensive drying equipment because all of the rice crop of the year in a given locality must be harvested in a short period of time. Furthermore, such drying equipment usually operates for only one or two months a year, remaining idle for the remainder of the year; hence, the entire expense of installing, maintaining and operating the drying equipment must be charged to its operation during this short period.

The use of ethylene oxide with carbon dioxide containing, say 10 parts of carbon dioxide for each part of ethylene oxide in the treatment of various dried food products as a fumigant to destroy microorganisms has been suggested. The present invention is concerned not with the fumigation of dried foods in which the tissue is in a state of rest ond physiologically inactive (dead or practically dead) to destroy microorganisms, but with the treatment of rough rice, which is in a physiologically active state, during storage so that it remains in this state while in storage for long periods of time, desirably of the order of several months, and this without development of objectionable odor, color or flavor. Furthermore, the treatment of rough rice by such fumigation procedures results in objectionable discoloration of the rough rice.

If it is attempted to preserve the rough rice by completely replacing the air surrounding it in storage by an inert gas, such as carbon dioxide or nitrogen, this would result in a stoppage of the growth of aerobic microorganisms and reduce respiration, which are both beneficial for the preservation of the rice. However, such treatment would also interfere with the physiological activities of the rice with consequent undesirable change in the rice evidenced by bad odors and flavors.

It is among the objects of this invention to provide a process of preserving rough rice, which process eliminates the necessity for drying the rice and permits maintenance of the rough rice in storage in a physiologically active condition for relatively long periods of time, desirably several months and longer, and this without developing objectionable odors, color or flavor.

Still another object is to provide such process which results in a rough rice of high nutritional value, i. e., the treatment effects little or no loss in the vitamin content of the rough rice.

Other objects and advantages of this invention will be apparent from the following detailed description thereof.

In accordance with this invention the rough rice after harvesting and without drying is placed in a storage container, hereinafter referred to as a bin, and is maintained therein in an environment consisting of from 50 to 80 volume percent of carbon dioxide and from 20 to 50 volume percent of air. This enviroment may be provided by replacing about half or more of the air initially present in the bin with carbon dioxide and circulating the resulting mixture of air and carbon dioxide through the mass of rough rice in storage to obtain uniform distribution of the gas mixture throughout the particles of rough rice. Usually circulation from about 2 to about 3 hours is sufficient to accomplish this result. The rough rice remains in this environment while in storage.

The mixture of carbon dioxide and air circulated over and through the mass of rough rice in storage may be produced by replacing a portion of the air in the storage bin with an amount of carbon dioxide, so as to produce a mixture having the desired volumetric ratio of air to carbon dioxide and circulating the resultant mixture to obtain uniform distribution thereof throughout the mass of rice in storage. Alternatively, a mixture of air and carbon dioxide may be produced exteriorly of the storage bin and this mixture recirculated through the mass of rough rice in storage until the air has een replaced by the medium containing the desired proportions of air and carbon dioxide and the desired environment is created throughout the mass of rough rice in the storage bin.

While this invention may be carried out using a mixture consisting of air and carbon dioxide, it is preferred to employ a mixture which also contains a small amount of an olefin oxide, desirably ethylene oxide or propylene oxide. The olefin oxide not only serves to kill microorganisms, but is believed to have a catalytic effect on the desired action of carbon dioxide to reduce the life processes of the rough rice. Thus, the preferred embodiment of the invention involves the maintenance of the rough rice in an environment consisting of from 50 to 80 parts by volume of carbon dioxide, from 20 to 50 parts by volume of air, and from 0 to 0.1 part by volume of olefin oxide. The gases in these proportions provide an environment in which the living cells of the rough rice are in equilibrium at a much lower level of activity than is the case in connection with rough rice in an all air medium. This may explain why the invention is effective to preserve rough rice for relatively long periods of time, of the order of several months and longer, but it will be understood the invention is not limited to this explanation.

When it is desired to store the rough rice for relatively long periods of time, say six months or longer, the environment should contain olefin oxide. When the rough rice is stored for less than six months the olefin oxide need not be used; however, its use in the catalytic amounts indicated is beneficial.

In accordance with a preferred embodiment of this invention, the rough rice after harvesting is placed in a storage bin. Thereafter, while the top of the bin remains open, carbon dioxide in amount to replace from one-half to 80 volume percent of the air initially present is introduced. The bin is then closed but not sealed air-tight and the desired catalytic amount of olefin oxide introduced. The bin is then sealed air-tight and by means of a pump and connected conduits, the air, carbon dioxide and olefin oxide mixture circulated throughout the mass of rice in the bin to uniformly distribute it therethroughout. This may take 2 to 3 hours. In those cases where the rough rice is stored for long periods of time, say more than six months, the above described treatment may be repeated, say after six months, to insure the presence of the desired environment throughout the storage period.

Within the above mentioned range, the exact proportions of the carbon dioxide, air and olefin oxide, if used, may be varied and will depend on the variety of the rough rice treated, its moisture content, atmospheric temperature conditions and the duration of the storage. In general, when the rice is stored under relatively severe conditions, i. e., high moisture, high prevailing temperatures and long periods of preservation in storage an amount of olefin oxide near the upper limit of 0.1% by volume of the total volume of gases present should be employed. Under such severe conditions carbon dioxide in amount near the upper portion of the 50% to 80% range may be used with correspondingly smaller amounts of air. As the conditions become less severe, less olefin oxide may be used, or, as above indicated, may be omitted entirely and the amount of carbon dioxide desirably is of the order of 50% of the gas mixture, the remainder being the air.

The following example is given for purposes of illustration only. It will be understood the invention is not limited to this example.

The rough rice, as harvested, was placed in a storage bin and through an opening at the base of the bin, carbon dioxide was introduced until one-half of the air in the bin had been vented through a top opening. Ethylene oxide in an amount equal to 0.1% of the volume of the bin was then introduced and the resultant mixture circulated by means of a pump to produce a uniform distribution of the gas mixture throughout the whole mass of rice. This took about 2 hours. The rough rice after storage for six months was examined and found to be in excellent condition.

It will be noted the present invention provides a method of preserving rough rice which does not require drying of the rice with consequent saving in the cost of installing, maintaining and operating the drying equipment heretofore employed. Furthermore, the invention results in a rough rice of exceptionally good nutritional value in that the vitamin content of the rice is substantially unaffected by the treatment. The rough rice when processed in accordance with my invention has substantially the same color as when harvested and does not develop objectionable odor or flavor.

Since certain changes may be made in carrying out the above process without departing from the scope of the invention, it is intended that all matter contained in the above description shall be interpreted as illustrative and not in a limiting sense.

What is claimed is:

1. A process of preserving rough rice during storage, which comprises maintaining said rough rice while in storage in an environoment containing from 50% to 80% carbon dioxide and 20% to 50% air.

2. A process of preserving rough rice during storage, which comprises maintaining said rough rice while in storage in an environment containing from 50 to 80 parts carbon dioxide, 20 to 50 parts air and 0 to 0.1 part of olefin oxide.

3. The process as defined in claim 2, in which the olefin oxide is ethylene oxide.

4. A process of preserving rough rice, which comprises placing the rough rice in the undried condition in a storage bin, introducing into said storage bin an amount of carbon dioxide to produce a gaseous mixture in contact with the rough rice containing from 50% to 80% carbon dioxide and from 20% to 50% of air, circulating this gaseous mixture over the rough rice until it is uniformly distributed throughout the rough rice and maintaining the rough rice in said storage bin in the presence of said gaseous mixture.

5. A process of preserving rough rice, which comprises placing the rough rice in the undried condition in a storage bin, introducing into said storage bin an amount of carbon dioxide to produce a gaseous mixture in contact with the rough rice containing from 50 to 80 parts of carbon dioxide and from 20 to 50 parts of air, introducing from 0 to 0.1 part of olefin oxide into said bin, circulating the resultant gaseous mixture over the rough rice until it is uniformly distributed throughout the rough rice and maintaining the rough rice in said storage bin in the presence of said gaseous mixture.

6. A process of preserving rough rice, which comprises placing the rough rice in the undried condition in a storage bin, introducing into said storage bin an amount of carbon dioxide to produce a gaseous mixture in contact with the rough rice containing from 50 to 80 parts of carbon dioxide and from 20 to 50 parts of air, introducing about 0.1 part of ethylene oxide into said bin, circulating the resultant gaseous mixture over the rough rice until it is uniformly distributed throughout the rough rice and maintaining the rough rice in said storage bin in the presence of said gaseous mixture.

References Cited in the file of this patent

UNITED STATES PATENTS

| | | |
|---|---|---|
| 1,036,243 | Hooker | Aug. 20, 1912 |
| 2,189,947 | Griffith et al. | Feb. 13, 1940 |
| 2,379,677 | Borsakovsky | July 3, 1945 |
| 2,381,421 | Balls et al. | Aug. 7, 1945 |
| 2,585,978 | Van Atta et al. | Feb. 19, 1952 |